(12) United States Patent
Baron et al.

(10) Patent No.: US 11,941,344 B2
(45) Date of Patent: Mar. 26, 2024

(54) DOCUMENT DIFFERENCES ANALYSIS AND PRESENTATION

(71) Applicant: Dropbox, Inc., San Francisco, CA (US)

(72) Inventors: Amir Baron, Tel Aviv (IL); Zach Johnston, San Francisco, CA (US); Anat Danziger, Tel Aviv (IL); Mark Kaplan, Tel Aviv (IL); Omer Tamir, Tel Aviv (IL); Julia Pfeiffenberger, San Francisco, CA (US); Meir Morgenstern, Tel Aviv (IL); Adam Fyne, Tel Aviv (IL)

(73) Assignee: Dropbox, Inc., San Francisco, CA (US)

( * ) Notice: Subject to any disclaimer, the term of this patent is extended or adjusted under 35 U.S.C. 154(b) by 457 days.

(21) Appl. No.: 15/280,442

(22) Filed: Sep. 29, 2016

(65) Prior Publication Data

US 2018/0089155 A1 Mar. 29, 2018

(51) Int. Cl.
*G06F 17/00* (2019.01)
*G06F 16/34* (2019.01)
*G06F 16/93* (2019.01)
*G06F 40/143* (2020.01)
(Continued)

(52) U.S. Cl.
CPC .......... *G06F 40/143* (2020.01); *G06F 16/34* (2019.01); *G06F 16/93* (2019.01); *G06F 40/194* (2020.01); *G06F 40/197* (2020.01)

(58) Field of Classification Search
CPC ............ G06F 17/2288; G06F 17/2211; G06F 17/2247; G06F 17/30011; G06F 17/3023; G06F 8/70; G06F 8/71; G06F 16/93; G06F 16/178; G06F 40/197; G06F 40/194; G06F 40/14; G06F 16/34; G06F 40/166;
(Continued)

(56) References Cited

U.S. PATENT DOCUMENTS 7,165,215 B2 * 1/2007 Tunning .................. G06F 9/451
715/234
8,015,496 B1 * 9/2011 Rogers .................. G06F 16/954
715/751
(Continued)

OTHER PUBLICATIONS

Douglis, F. et al., "Tracking and Viewing Changes on the Web," © 1996, USENIX Technical Conference, 13 pages.*
(Continued)

*Primary Examiner* — Cesar B Paula
*Assistant Examiner* — James H. Blackwell
(74) *Attorney, Agent, or Firm* — Polsinelli PC

(57) ABSTRACT

The present technology pertains to displaying a version of a content item and an indication of differences between that version and another version of the content item. For example, a content management system can iterate through portions of a first version of a content item and attempt to match those portions with portions of a second version of the content item. The content management system can analyze these matches to determine differences between the respective portions and to classify and categorize the differences (e.g., do they represent a significant change or do they change the meaning of the content item). A client device can then represent a clean version of the content item in a first application and the differences and characteristics in a second application in coordination with the first application.

20 Claims, 12 Drawing Sheets

(51) Int. Cl.
*G06F 40/194* (2020.01)
*G06F 40/197* (2020.01)

(58) Field of Classification Search
CPC .............. G06F 3/1454; H04L 67/1097; H04L 65/4015; H04L 12/1813
USPC ...................................................... 715/229
See application file for complete search history.

(56) References Cited

U.S. PATENT DOCUMENTS

| | | | | |
|---|---|---|---|---|
| 8,386,504 | B1* | 2/2013 | Wood | G06F 16/284 707/758 |
| 8,453,136 | B1* | 5/2013 | Hahn | G06F 8/355 716/100 |
| 8,739,019 | B1* | 5/2014 | Nevins | G06F 3/013 715/203 |
| 8,965,983 | B2 | 2/2015 | Costenaro | |
| 2003/0028561 | A1* | 2/2003 | Gounares | G06F 40/166 715/234 |
| 2003/0135607 | A1* | 7/2003 | Bernard | G06F 17/30011 709/224 |
| 2004/0230952 | A1* | 11/2004 | Massaro | G06F 40/194 717/120 |
| 2005/0097434 | A1* | 5/2005 | Storisteanu | G06F 40/194 715/249 |
| 2005/0138540 | A1* | 6/2005 | Baltus | G06F 17/2211 715/229 |
| 2006/0168547 | A1* | 7/2006 | Boyles | G06F 16/954 715/854 |
| 2006/0288842 | A1* | 12/2006 | Sitrick | G09B 15/002 84/477 R |
| 2007/0061751 | A1* | 3/2007 | Cory | G06Q 10/10 715/804 |
| 2008/0003559 | A1* | 1/2008 | Toyama | G09B 7/02 434/350 |
| 2008/0155397 | A1* | 6/2008 | Bissonnette | G06F 40/14 715/256 |
| 2008/0177800 | A1* | 7/2008 | Arkhipov | G06F 9/451 |
| 2008/0178117 | A1* | 7/2008 | Gelman | G06F 3/0481 715/808 |
| 2011/0197121 | A1* | 8/2011 | Kletter | G06F 40/166 715/234 |
| 2012/0136862 | A1* | 5/2012 | Glover | G06F 17/10 707/737 |
| 2013/0013991 | A1* | 1/2013 | Evans | H04N 5/765 715/206 |
| 2013/0212250 | A1* | 8/2013 | Kleppner | H04L 67/06 709/224 |
| 2014/0006922 | A1* | 1/2014 | Smith | G06F 40/197 715/234 |
| 2014/0033088 | A1 | 1/2014 | Shaver | |
| 2014/0033101 | A1* | 1/2014 | Rein | G06F 17/30575 715/771 |
| 2014/0123076 | A1* | 5/2014 | Gandhi | G06F 17/2288 715/854 |
| 2014/0223272 | A1* | 8/2014 | Arora | G09B 5/06 715/203 |
| 2014/0282213 | A1* | 9/2014 | Musa | G06F 3/0481 715/781 |
| 2014/0289645 | A1* | 9/2014 | Megiddo | G06F 3/048 715/753 |
| 2015/0012528 | A1* | 1/2015 | Kapadia | G06F 17/2288 707/722 |
| 2015/0288774 | A1* | 10/2015 | Larabie-Belanger | H04L 67/24 715/758 |
| 2015/0339282 | A1* | 11/2015 | Goyal | G06F 17/241 715/229 |
| 2016/0055196 | A1* | 2/2016 | Collins | G06F 40/197 707/690 |
| 2016/0147774 | A1* | 5/2016 | Xiao-Devins | G06F 17/30064 707/722 |
| 2016/0259508 | A1* | 9/2016 | Eccleston | G06F 3/0484 |

OTHER PUBLICATIONS

Wang, Y. et al., "X-Diff: An Effective Change Detection Algorithm for XML Documents," (2003) IEEE, pp. 519-530.*

Lim, Seung-Jin et al., "An Automated Change-Detection Algorithm for HTML Documents Based on Semantic Hierarchies," (2001) IEEE, pp. 303-312.*

Jackson, D. et al., "Semantic Diff: A Tool for Summarizing the Effects of Modifications," (1994) IEEE, pp. 243-252.*

Chawathe, S.S. et al., "Meaningful Change Detection in Structured Data," (1997) ACM, pp. 26-37.*

PCT Search Report and Written Opinion dated Aug. 21, 2017 in corresponding PCT Application No. PCT/US2017/040579, filed Jul. 3, 2017 to Applicant Dropbox, Inc., titled "Document Differences Analysis and Presentation", 18 pages.

Ty Anderson et al., "Working with Others" In: "Beginning Microsoft Word 2010", Aug. 23, 2010, Apress, Berkeley, CA, pp. 243-273.

"Word Doc Diff (File Compare Software)", SoftInterface, Inc., Santa Monica, CA, 5 pages. (Available online at http://www.softinterface.com/wdd/wdd.htm, retrieved on Aug. 4, 2016).

* cited by examiner

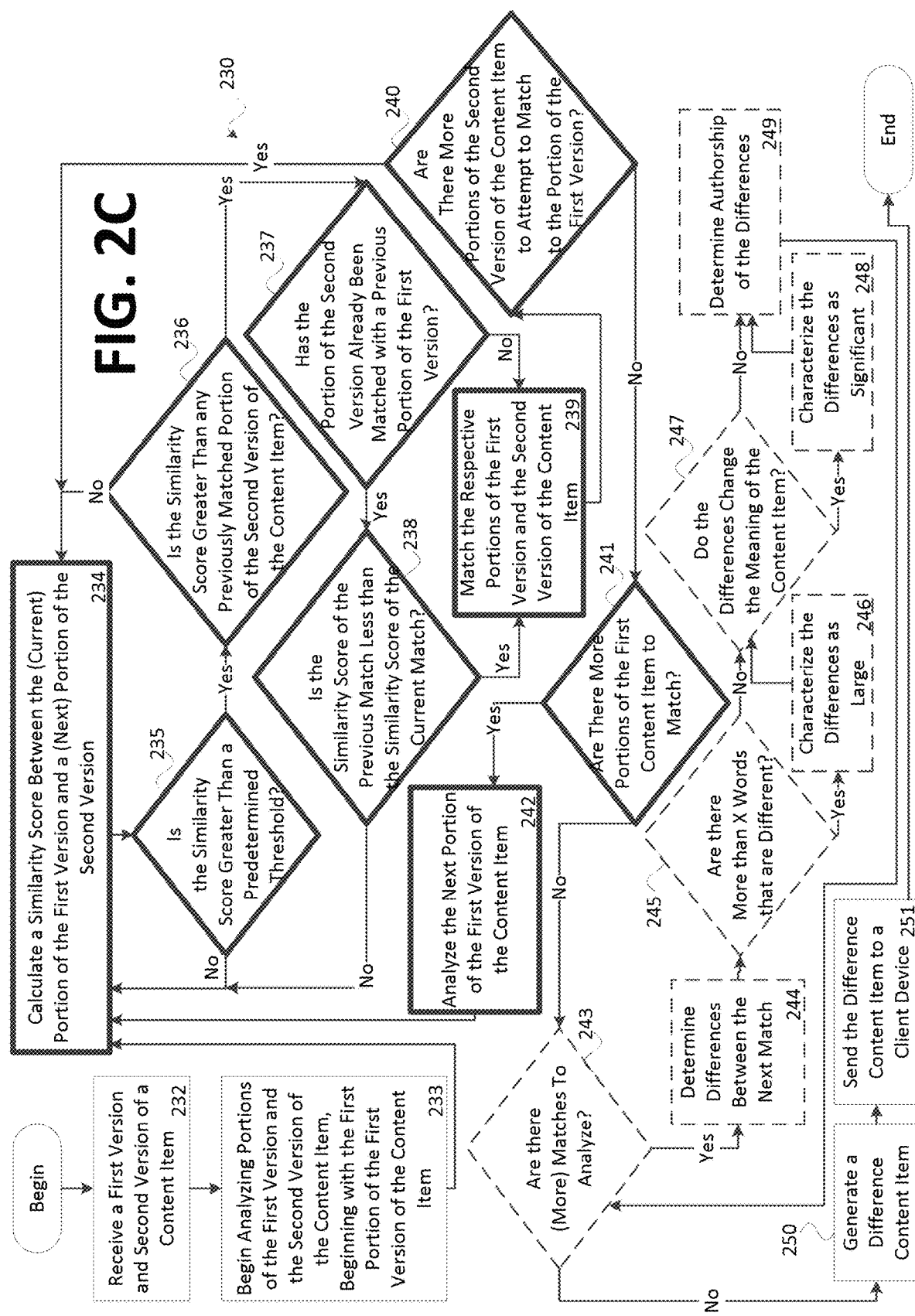

FIG. 5A

John made an edit

Paragraph moved

Eum ne melius concludaturque. Nam no persius expetenda similique. Id nisl dicam tempor duo, ex legimus detracto instructior eam. Habemus fierent ne has. Facete interesset disputando sea eu, at debitis nonumes cum. Eu dicam graece est.

2 mins ago

FIG. 5B

John made an edit

Paragraph edited

~~Eum ne melius concludaturque. Nam no persius expetenda similique. Id nisl dicam tempor duo, ex legimus detracto instructior eam.~~ Habemus fierent ne has. <u>Facete interesset disputando sea eu, at debitis nonumes cum. Eu dicam graece est.</u>

2 mins ago

FIG. 5C

John made an edit

Paragraph moved and edited

~~Eum ne melius concludaturque. Nam no persius expetenda similique. Id nisl dicam tempor duo, ex legimus detracto instructior eam.~~ Habemus fierent ne has. <u>Facete interesset disputando sea eu, at debitis nonumes cum. Eu dicam graece est.</u>

2 mins ago

FIG. 5D

John made an edit

Multiple paragraphs edited

~~Ullum dicta at his, illud nihil delectus duo eu.~~

Pri choro consul placerat eu.

2 mins ago

FIG. 5E

John made an edit

Minor Change — 310

~~Eum ne melius concludaturque.~~ Nam no persius expetenda similique. ~~Id nisl dicam tempor duo, ex legimus detracto instructior eam.~~ Habemus fierent ne has. <u>Facete interesset disputando sea eu, at debitis nonumes cum. Eu dicam graece est.</u>

2 mins ago

FIG. 5F

John made an edit

Significant Change ← 310

Terms of Contract:

Price: ~~$200~~ <u>$100</u>

Delivery Date:
~~1 June 2016~~
<u>1 August 2016</u>

2 mins ago

Email

From: Changes@ContentManagementSystem.com
To: Susan@company.com
Subject: Changes have been made to Document.docx 1 June 2016 2:30 pm   John made the following changes:

> Paragraph moved
>
> Eum ne melius concludaturque.
> Nam no persius expetenda
> similique. Id nisl dicam tempor
> duo, ex legimus detracto
> instructior eam. Habemus
> fierent ne has. Facete interesset
> disputando sea eu, at debitis 1 June 2016 5:30 pm   David made the following changes:

> Paragraph edited
>
> Eum ne ~~melius concludaturque~~.
> ~~Nam no persius expetenda~~
> ~~similique. Id nisl dicam~~ tempor
> duo, ex legimus detracto
> instructior eam. Habemus
> fierent ne has. Facete interesset
> disputando sea eu, at debitis

FIG. 8

DOCUMENT DIFFERENCES ANALYSIS AND PRESENTATION

BACKGROUND

Comparing different versions of documents can be difficult. For example, multiple authors can be contributing to a document and producing various versions. When one author reviews an updated version of the document, that author might wish to identify the differences between the updated version and a previous version. One approach is to track changes as they are made and store the tracked changes within the document. Storing changes within a document makes versioning of documents difficult and can be undesirable when the author wants to also have a readily-available "clean" version. Further, representing changes within a document editor can clutter the interface and confuse the reader and author.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for analyzing versions of a document to determine differences between the versions and presenting the differences along with a version of the document.

A content management system can receive a first and second version of the content item and analyze the versions to determine the differences between the content items. The content management system can then save a file describing the differences. The content management system can then send the file describing the differences to a client device. A client device can then display a version of the file in a first application with the differences being displayed in a second application.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 2C shows an example method for identifying matches and characterizing matches between two versions of a content item;

FIG. 5A-FIG. 5F show various graphical user interfaces for presenting differences according to some embodiments;

FIG. 8 shows an example email including a content item history;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a system to analyze versions of a document to determine differences between the versions and present the differences along with a version of the document.

Figure 1:
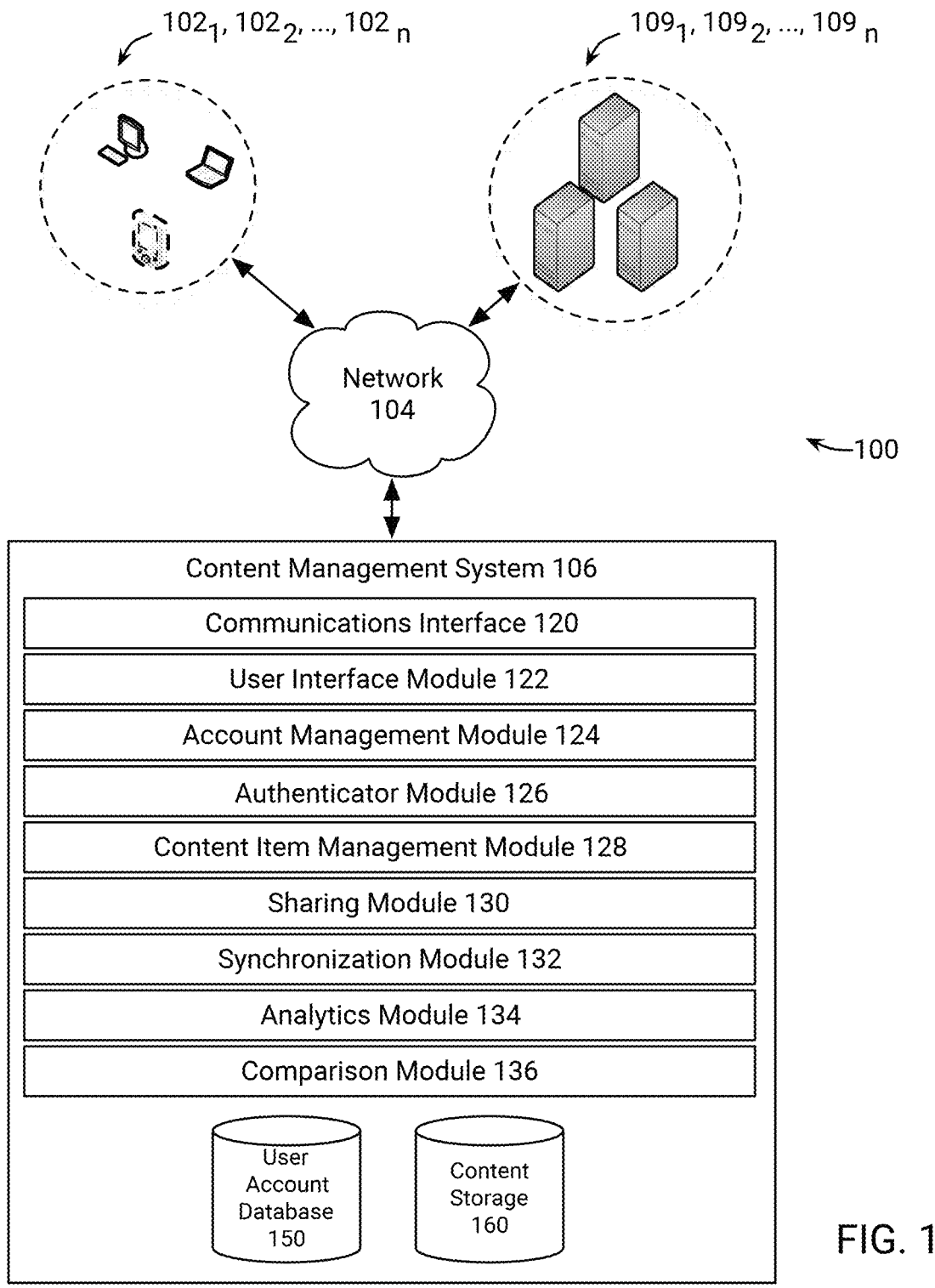
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content items and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, . . . , $102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content items from multiple client devices 102. For example, client device $102_i$ can upload content items to content management system 106 via network 104. Later, the same client device $102_i$ or some other client device $102_j$ can retrieve the content items from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content item storage locations, security settings, personal configuration settings, content item sharing data, etc. Account management module 124 can be configured to update and/or obtain user account details in user account database 150. The account management module 124 can be configured to interact with any number of other modules in content management system 106.

An account can be used to store content items, such as digital data, documents, text files, audio files, video files, etc., from one or more client devices 102 authorized on the account. The content items can also include collections for grouping other content items together with different behaviors, such as folders, playlists, albums, etc. For example, an account can include a public folder that is accessible to any user. The public folder can be assigned a web-accessible address. A link to the web-accessible address can be used to access the content items of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content items in client device $102_i$'s file system with the content items in an associated user account. In some cases, the client software can synchronize any changes to content items in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection. The client software can provide notifications of synchronization operations, and can provide indications of content item statuses directly within the content management application. Sometimes client device $102_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content items via a web interface generated and served by user interface module 122. For example, the user can navigate in a web browser to a web address provided by content management system 106. Changes or updates to content items in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content items and/or service providers $109_1$, $109_2$, ..., $109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content items publicly or privately. Sharing content items publicly can include making the content item accessible from any computing device in network communication with content management system 106. Sharing content items privately can include linking a content item in content storage 160 with two or more user accounts so that each user account has access to the content item. The sharing can be performed in a platform agnostic manner. That is, the content items can be shared across multiple client devices 102 of varying type, capabilities, operating systems, etc. The content items can also be shared across varying types of user accounts.

In some embodiments, content management system 106 can be configured to maintain a content directory identifying the location of each content item in content storage 160. The content directory can include a unique content entry for each content item stored in the content storage.

A content item entry can include a content item path that can be used to identify the location of the content item in a content management system. For example, the content item path can include the name of the content item and a folder hierarchy associated with the content item. For example, the content item path can include a folder or path of folders in which the content item is placed as well as the name of the content item. Content management system 106 can use the content item path to present the content items in the appropriate folder hierarchy.

A content item entry can also include a content item pointer that identifies the location of the content item in content storage 160. For example, the content item pointer can include the exact storage address of the content item in memory. In some embodiments, the content item pointer can point to multiple locations, each of which contains a portion of the content item.

In addition to a content item path and content item pointer, a content item entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

Comparison module 136 can be configured to receive multiple versions of a content item and identify changes between them. Comparison module 136 can divide the versions of the content items into portions (e.g., tables, chapters, pages, paragraphs, sentences, words, tokens, etc. or any combination thereof) and identify matching portions based on similarities between portions. After matching portions of one version to portions of the other version, comparison module 136 can identify the differences between matched portions and attempt to characterize the differences. Comparison module 136 can then create a content item that includes the differences or mark the differences in one of the versions. The versions can be associated with different client devices 102, user accounts, etc. Comparison module 136 can identify data removal, addition, movement, etc. between versions of the content item. Comparison module 136 can identify differences between text documents (e.g., a lawyer can identify modifications to a contract), programming code (a programmer can see what changed between a stable and unstable build), 2D/3D graphics (an artist can see what modifications a client made), sound files, music scores, presentations, websites, data streams, virtual machine images, etc. It should be understood that identifying changes in content items has a myriad of applications for all types of content items.

While content management system 106 is presented with specific components, it should be understood by one skilled in the art, that the architectural configuration of system 106 is simply one possible configuration and that other configurations with more or fewer components are possible.

Figures 2A, 2B:
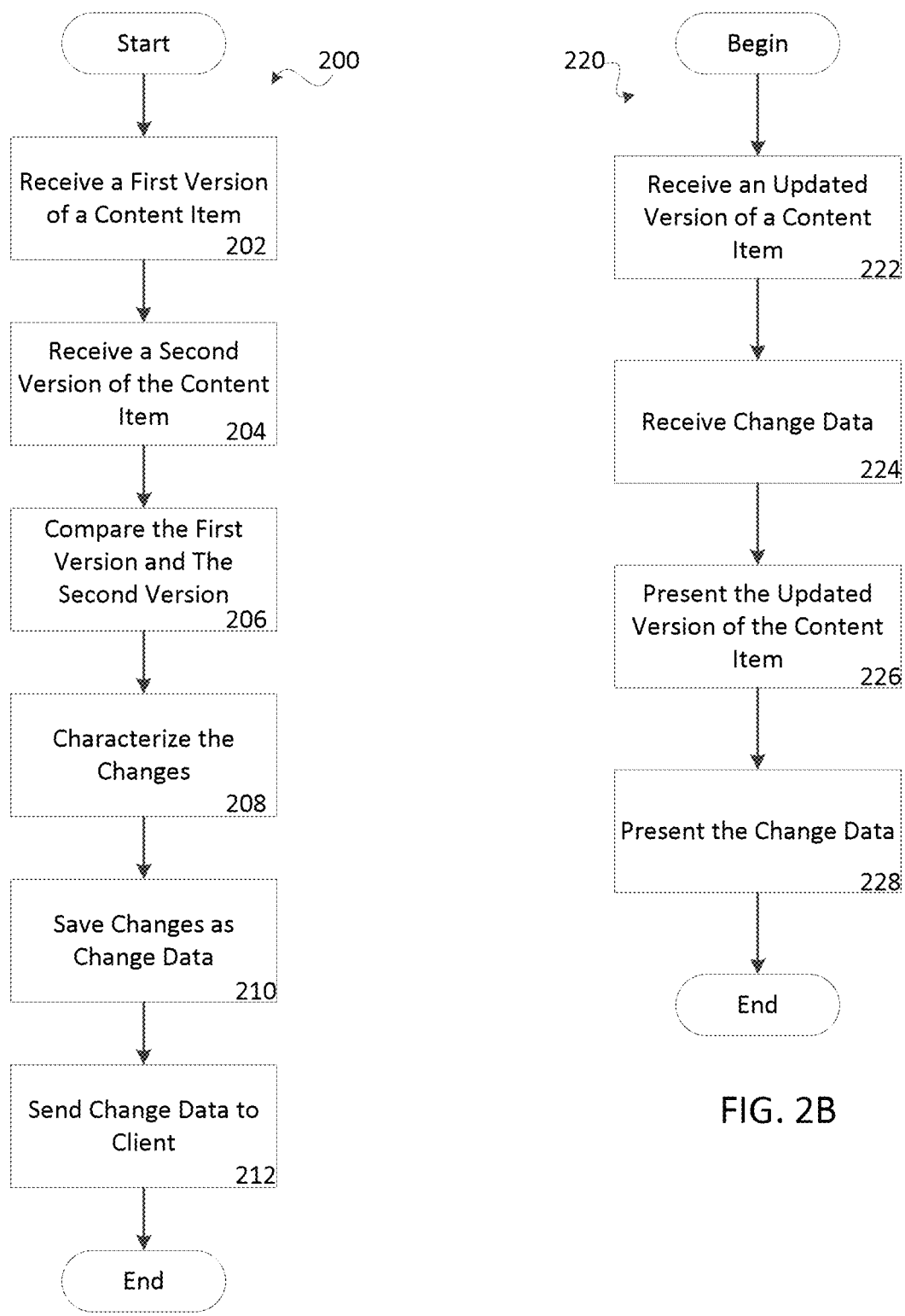
FIG. 2A shows an example method for comparing content items according to some embodiments.
FIG. 2B shows an example method for presenting change data according to some embodiments.

FIG. 2A shows an example method for comparing content items and FIG. 2B shows an example method for presenting change data according to some embodiments. Client device 102 and/or content management system 106 can perform example methods 200 and/or 220, independently or in cooperation. For example, content management system 106 can perform example method 200 while client device 102 can perform example method 220.

A system performing example method 200 of FIG. 2A can begin and receive a first version of a content item (step 202). For example, content management system 106 can receive the first version of the content item by way of a synchronization process with client device 102. Content management system 106 can also receive a first version of the content item when a user creates or modifies a content item using a web interface accessible to the content management system for creating or editing a content item.

The system can continue and receive a second version of the content item (step 204). The system can use the same path or process to receive a version of the content item in step 204 as in step 202. For example, the system can receive the first version of the content item from client device 102 and the second version of the content item from the same client device 102. Alternatively, the system can use a different path or process to receive a version of the content item in step 204 than in step 202. For example, the system can receive the first version from client device 102 via a web interface and the second version from client device 102 via a synchronization module 132. In such embodiments, the web interface receives a representation of the content item and sends a representation of the content item (or a modification thereof) to the system while the synchronization program sends the complete content item to the system. Additionally or alternatively, the system can receive the two versions from different client devices 102.

Receiving by content management system 106 in step 202 and/or step 204 can include connecting to content storage 160. For example, content management system 106 can receive a second version of the content item and store it in content storage 160, which can trigger comparison module 136 to obtain a first version from content storage 160. Content management system 106 can, upon receipt of a version of the content item from client device 102, send the version of the content item to content storage 160 and comparison module 136.

It should be understood that, in some embodiments, step 202 and/or step 204 can be performed without client device 102; for example, versions of the content item can be created and managed within content management system 106. Content management system 106 can create a version of the content item by applying processes to the content item such as: a spellcheck that can automatically save a corrected version; an unauthorized or unintentional process that corrupts the content item resulting in a new version; a backup process that encounters an error in copying the content item resulting in a new version; a censoring process that creates a new version of the content item by removing sensitive information; a process that receives a command from client device 102 to create a new version of the content item (e.g., a command to add, remove, merge, or modify a portion of the content item); etc.

In some embodiments, comparison module 136 can receive a comparison instruction (e.g., from another module on content management system 106 or from client device 102) identifying a content item in content storage 160. Comparison module 136 can identify a first version and a second version of the content item. Alternatively, the comparison instruction can specify the first version and the second version of the content item, thus obviating the need for comparison module 136 to identify the versions of the content item as a first version or second version. Comparison module 136 can then obtain the first version and the second version of the content item from content storage 160.

Although "first version" and "second version" can represent a sequential order of versions between content items, it should be understood that in some embodiments, content item versions can be created in any order. The terms first version and second version are used herein to refer to different versions of content items, these terms are not limited to an initial version and an immediately subsequent version. Rather first version refers to a specific version of the content item, and second version refers to another specific version of the content item, where the two versions are different versions.

In some embodiments, the system initially lacks an indication that the first version and the second version are different versions of the same content item. For example, the first version can have a different name, path, or metadata than the second version. The system can receive an instruction to perform example method 200 with the first version and a relevant version (e.g., a user may know of a relevant second version but does not wish to manually identify the second version—relying on the system to automatically identify the second version). In order to automatically pair the second version with the first version for the purposes of example method 200, step 204 can include matching the first version of the content item with the second version of the content item. One technique to accomplish this includes analyzing the file history of the two versions (e.g., a user on client device 102 might have overwritten the first version with the second version). In some embodiments, the system can match the two versions by comparing the name and file path of the respective versions content item. In some embodiments, the system can match the two versions by analyzing the contents of the versions of the content item; for example, the system can compare the contents of the first version of the content item with the contents of multiple other content items, identifying the most similar other content item as the second version. In some embodiments, each version of the content item has metadata and matching can include determining that at least a portion of the metadata is identical. The system can keep a version history of the content item, which can identify the first version and the second version. In some embodiments, the system can match the two versions through manual input (e.g., a user explicitly identifies the first version and the second version). Content management system 106 can (e.g., using content item management module 128) track versions of content items.

Comparison module 136 can then compare the first version and the second version (step 206). This can include identifying changes (e.g., differences) between the first version and the second version of the content item. Changes can be style/formatting changes, content changes, metadata changes (including tags, comments, etc.), or any other change (including changes that may not be reflected in most representations of the content item). In some embodiments, changes can be substantively imperceptible (e.g., changing the font of a space character or a tab character being used instead of a paragraph indentation). These substantively imperceptible changes can be identified as normal changes, imperceptible changes, or ignored.

It should be understood that, as used herein, the terms "change", "modification", and "difference" are generally interchangeable.

In step 206 comparison module 136 can assign similarity scores (e.g., comparison scores) to portions of versions of content items to help identify corresponding portions between versions. This can include attempting to match each paragraph (or portion) of a first version of a content item with a paragraph (or portion) of a second version of the content item; each attempted match can generate a similarity score and the pair of paragraphs with the highest similarity score can be a match. Remaining pairs of paragraphs can be matched according to their similarity scores. Matching paragraphs do not need to be located in similar places within the versions. In some embodiments, pairs from each content item will only match if their similarity score is above a certain threshold. In some implementations, two or more paragraphs can be "substantially identical" when a similarity score computed between the two or more paragraphs is above a threshold level. In some implementations, two or more paragraphs can be "substantially identical" when a difference score computed between the two or more paragraphs is below a threshold level.

Comparison module 136 can identify nested changes (e.g., a change within a change). For example, comparison module 136 can identify a paragraph being moved to a different location and then a sentence of that paragraph being modified. As a counter-example, without identifying the nested change, the system might identify the text in the new location as being a new paragraph while the old paragraph was deleted. Comparison module 136 can identify nested changes by running the change identification techniques herein disclosed on the pair of matched portions to match (and determine the differences between) sub-portions of the matched portions. For example, a paragraph in a first version can be matched to a paragraph in a second version. Comparison module 136 can then divide the two paragraphs into sub-portions such as sentences. Comparison module 136 can then match sentences from the respective paragraphs and identify changes made between the matched sentences according to the principles herein disclosed.

Once portions, sub-portions, paragraphs, etc. are matched, differences (e.g., changes) between the portions, sub-portions, paragraphs, etc. can be determined. For example, the system can determine that: a word was added, removed, modified, etc.; that a style was changed; that tags were added; etc.

Alternatively or additionally to using the above technique to detect matches and differences in two versions of content item, a "tracked changes" feature of a content item editing application (such as a word processing application) can be used to identify some of the differences between the two version of the content item.

In some embodiments, authorship can be attributed to identified differences in content items. Metadata can indicate that a certain author authored the content item or a portion of the content item; this authorship information can be used for authorship attribution of the identified changes. Additionally or alternatively, the system can reference a user account associated with the respective version of the content item to assign authorship attribution of the identified changes. For example, a document can "track changes" that assigns authorship information to a tracked change, the document can have an "author" field that assigns authorship information to the document, and an account that synchronizes the document can have an account identifier. Each of these can inform authorship identification. Identifying authorship can result in a plurality of authors being attributed to a single version of a content item (each identified difference having an identified author).

It should be understood that steps 204 and 206 can be used to determine relative ordering of versions of the content item. For example, the system can determine that the first version preceded the second version because such an ordering would have more differences being identified as "additions" than "deletions."

Comparison module 136 can characterize the changes (step 208). For example, changes can be characterized by absolute or relative size (e.g., small, medium, large), significance (e.g., unimportant, moderate, important), author (e.g., grouping changes by authorship), quality (e.g., style, substance, metadata), etc. By way of example, a difference size characterization can be based on the percentage of a paragraph that was modified; e.g., if more than a predetermined percentage of a content item (or respective paragraph) is modified, the change can be characterized as large. Another example includes determining a size characterization based on an absolute size of the change; e.g., if 20 words or more are added, the change can be identified as a large change, regardless of the size (e.g., number of words) of the content item (or respective paragraph). Another example includes characterizing the importance of a change based on whether the changes modifies the meaning of the relevant portion of the content item; this can be determined using natural language processing, using a thesaurus (e.g., if the change is merely replacing a word with its synonym, then it can be an unimportant change), determining if the change deals with style or content (e.g., adding emphasis to a portion can be considered a moderate change), etc.

Step 208 can include summarizing changes; for example, if a paragraph is deleted, a summary can be produced describing the deleted paragraph can be generated (e.g., "the paragraph describing next week's agenda was deleted"). In some embodiments, comments provided by an author can inform a characterization of the changes. In some embodiments, the system can use various machine learning and natural language processing techniques to characterize changes.

The system can then save changes as change data (step 210). For example, step 210 can include saving a "change content item" associated with a version of the content item, the change content item identifying the changes between the first and second versions of the content item while not identifying commonalities between the two versions. The change content item can be in the form of an XML or JSON file. Step 210 can include saving a new version of the content item (e.g., a third version with an indication of the changes). Step 210 can include saving an entry in a database. In some embodiments, change data can be saved within the associated content item (or within a version of the content item). The change data can include an identifier to the content item, changes made to the versions of the content item, and/or authorship of the respective changes.

The system can then send change data to a client (step 212). For example, change data can be sent to client device 102 from content management system 106. In some embodiments, change data is sent to client 102 as part of a synchronization process or responsive to a request for change data. Example method 200 can then end.

In some embodiments, at least some steps of example method 200 can be performed by client device 102 wherein client device 102 can function as an extension of or in coordination with comparison module 136. For example, client device 102 can compare two versions of a content item, determine the changes between the versions, save the changes, and transmit change data to content management system 106. In some embodiments, client device 102 can transmit the change data as part of a synchronization process. In some embodiments, client device 102 can save a temporary version of the content item while an application is accessing the content item (e.g., if a user has made modifications to the content item but has not yet saved the modifications); client device 102 can then compare the temporary version of the content item with a previous version of the content item and transmit change data to content management system 106. In some embodiments, client device 102 transmits the change data to content management system 106 as comments associated with the content item. In some embodiments, the client device (or web-based content item editor) used to make edits to a content item can keep a log of edits made to a content item as they are happening, and can send the log of edits to the comparison module 136 for further use.

FIG. 2B shows example method 220. A system performing example method 220 (e.g., client device 102) can begin and receive an updated version of a content item (step 222). The updated version of the content item can be the second version of the content item in example method 200. Step 222 can include requesting the updated version of the content item from, for example, content management system 106. In some embodiments, the system performing example method 220 performs step 222 as part of a synchronization process for the content item.

The system performing method 220 can then receive change data (step 224) from, for example, content management system 106. Step 224 can be performed simultaneously with step 222 or independently of step 222. For example, client device 102 can generate change data as part of a previous process and step 222 can include retrieving the previously generated change data. Change data can be received from a different system, machine, connection, port, process etc. than the updated version of the content item.

The system performing example method 220 can then present the updated version of the content item (step 226). For example, if the content item is a document, step 226 can include loading the content item in a word processor. Another example includes presenting the content item as part of a web page in a web browser. It should be understood that a mechanism used to "present" the updated version of the content item 226 can be adapted to the nature of the content item. For example, if the content item is a song, step 226 can include loading the content item in a music player. Step 226 can be responsive to a user selecting to open the content item from a native file system, a web interface, etc.

The system performing example method 220 can then present the change data (step 228). In some embodiments, the presentation of the updated version of the content item of step 226 is part of a first graphical user interface (e.g., a first application, process, window, section of a web page, etc.) and the presentation of the change data is of a second graphical user interface (e.g., a second application, process, window, section of a web page, etc.) coordinated with the first graphical user interface. For example, the presentation of an updated version of the content item can be by a word processor or word processing application, while the presentation of the change data can be by an application separate from the word processor. In some implementations, the first graphical user interface and second graphical user interface can both be part of a parent graphical user interface, e.g. as part of an operating system display. The second graphical user interface can be termed a comments section.

Accessing the content item (e.g., step 226) can trigger the presentation of the change data. Alternatively, the process that accesses the content item ("the accessor process") does not necessarily need to be aware of the process that presents change data (step 228). For example, the process that presents the change data can monitor system file activity of the content item. When the accessor process sends a request to the system to open the content item, the system can update a log, notify the process that presents the change data, or otherwise indicate that the accessor process has accessed the content item. For example a word processing application does not necessarily need to be aware that change data is also being displayed in the second graphical user interface.

In some embodiments the process that presents the change data is an applet, extension, plugin, module, sub-process, etc. of the accessor process.

The second graphical user interface can present comments along with the presentation of changes. These comments can be associated with the content item as a whole, a portion of the content item, or a specific change (e.g., a comment explaining why the change was made). While the accessor process does not need to be aware that change data is also being displayed in the second graphical user interface, the second graphical user interface does need to be coordinated with the first graphical user interface of the accessor process, and thus needs to be aware of at least some actions taking place in the first graphical user interface. For example, the process that presents the change data in the second graphical user interface can monitor the accessor process and coordinate what is displayed in the second graphical user interface to be pertinent to what is displayed in the first graphical user interface. For example, if a change is tied to a paragraph that is visible in the first graphical user interface, the second graphical interface should display the change for that paragraph.

In some embodiments the second user interface can receive and send instructions to the accessor process to adapt (or simulate interaction with) the first graphical user interface. Configured as such, an operation in the first graphical user interface can influence the presentation in the second graphical user interface and vice versa. For example, a user can scroll the first graphical user interface and the second graphical user interface can adapt to show changes relevant to a portion of the content item that is currently shown within the first graphical user interface. Additionally or alternatively, a user can select a change within the second graphical user interface and the first graphical user interface can adapt to show the relevant portion of the content item. In some embodiments, a caret or cursor position in the first graphical user interface can inform the representation in the second graphical user interface (e.g., showing changes relevant to the caret position). In some embodiments, a previous version of the content item can be shown in the first graphical user interface and the second graphical user interface facilitates applying changes individually (e.g., a user can select to accept certain changes and reject certain changes).

While various flow diagrams provided and described above may show a particular order of operations performed by certain embodiments of the invention, it should be understood that such order is an example (e.g., alternative embodiments can perform the operations in a different order, combine certain operations, overlap certain operations, etc.).

FIG. 2C shows example method 230 for identifying matches and characterizing matches between two versions of a content item. Content management system 106 can receive a first version and a second version of a content item (step 232). For example, it can receive at least one of the versions of the content item from content item management module 128, client device 102, etc. Content management system 106 can then analyze portions of the first version and the second version of the content item, beginning with the first portion of the first version of the content item (step 233). For example, content management system 106 can iterate through all portions of the first version of the content item and attempt to match them with portions of the second version of the content item.

The following steps 234-242 (with a bold outline in FIG. 2C) can be sub-steps or sub-methods of step 206 of example method 200.

Content management system 106 can calculate a similarity score between the (current) portion of the first version and a (next) portion of the second version of the content item (step 234). For example, if this is the first time that step 234 is run, the current portion of the first version can be the first portion of the first version while the next portion of the second version can be the first portion of the second version. Content management system 106 can keep track of the "current" portion and "next" portion. It can increment the "next" portion until all portions of the second version of the content item are analyzed with respect to the "current" portion. Content management system 106 can subsequently reset the "next" portion to be the first portion of the second version of the content item and increment the "current" portion of the first version. The similarity score can be based on how much of the portion of the first version matches the portion of the second version. In some embodiments, determining the similarity score can include performing a process similar to step 244, discussed below.

Content management system 106 can then determine if the similarity score is greater than a predetermined threshold (step 235). If it is not, content management system 106 can return to step 234. If it is above the predetermined threshold, content management system 106 can determine if the similarity score is greater than any previously matched portion of the second version of the content item (step 236). For example the portion of the first version may have already been matched with another portion of the second version, step 236 can determine if this attempted match is superior to the previous match. If it is not, content management system 106 can return to step 234 and move on to the next portion of the second version. If it is, content management system 106 can determine if the portion of the second version has already been matched with a previous portion of the first version (step 237). For example, step 237 can indicate whether the portion of the second version has already been matched. If so, content management system 106 can determine if the similarity score of the previous match is less than the similarity score of the current match (step 238). If not, content management system 106 can return to step 234 with a new portion of the second version of the content item. If the portion of the second version has not been previously matched (in step 237) or if the similarity score of the current match is greater (in step 238), the content management system 106 can match the respective portions of the first version and the second version of the content item (step 239). Matching in step 239 can mean that the two are assigned as a match until a better match is found for either the portion of the first version or the portion of the second version of the content item. If either portion had been previously matched before step 239, the matching in step 239 can replace any prior matching. If the portion of the second version had been previously matched, the corresponding (previously-matched) portion of the second version can be assigned a new match using the steps 234-242.

If there are more portions of the second version to match with the portion of the first version (step 240), then content management system 106 can return to step 234 with the next portion of the second version. If not, content management system 106 can determine if there are more portions of the first content item to find a match for (step 241). If there are, content management system 106 can analyze the next portion of the first version of the content item (step 242). For example, content management system 106 can then return to step 123 with the next portion of the first version and the first portion of the second content item.

If there are no more portions of the first version left to match (at step 241), content management system 106 can then determine if there are matches to analyze (step 243). Steps 243-249 (shown as dashed boxes in FIG. 2C) can be sub-methods or sub-processes of step 208 (of FIG. 2A). If there are matches to analyze, content management system 106 can determine differences between the (next) pair of matched portions of the two versions of the content item (step 244). If it is the first time performing step 244, content management system 106 can begin with the first match. Differences can be determined by utilizing similar procedures as steps 234-242 but analyzing sub-portions of the associated portion of the first version and sub-portions of the associated portion of the second version. After attempting to match sub-portions, sub-portions that are not matched can be identified as differences between the portions.

Content management system 106 can then determine if there are more than X (e.g., a predetermined amount or percentage of) words that are different between the two matched portions of the content item (step 245). Sub-portions that are identified as unmatched in step 244 can be the different words in step 245. If step 245 results in the affirmative, content management system 106 can then characterize the differences as large (step 246). Content management system 106 can then determine whether the differences change the meaning of the content item (step 247). For example, changing the meaning of the content item can include modifying an important term of the content item (e.g., if the content item is a contract, modifying an essential term), replacing a term with its antonym or negating the term, etc. If the differences have changed the meaning of the content item, content management system 106 can characterize the differences as significant (step 248). Content management system 106 can then determine authorship of the differences (step 249). Content management system 106 can determine authorship by referencing a user account that is associated with the respective version (e.g., the user account that synchronized the version), by referencing an authorship of the content item metadata, or by any other means. Content management system 106 can determine a status (present, away, retired, assigned to the project, currently viewing, currently modifying, etc.) or role of the author (e.g., supervisor, creator) the author's title (e.g., president, vice-president, technician, etc.).

Content management system 106 can return to step 243 and repeat steps 243-249 until no more matches are available to analyze. Content management system 106 can then generate a difference content item (step 250). For example, content management system 106 can generate a file that contains the differences between the two versions of the content item while omitting many of the similarities of the two versions. The difference content item can include the characterizations of steps 246 and 248 as well as the authorship from step 249, as well as any other associated information. In some embodiments, the differences are organized into groupings. For example, all changes that are attributed to one author are grouped together. Content management system 106 can then send the difference content item to a client device (step 251).

Figure 2D:
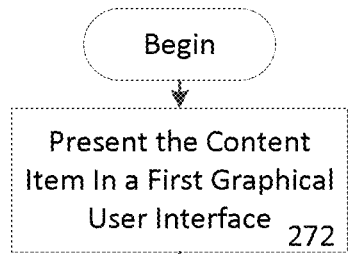
FIG. 2D shows an example method for a first application to present a content item and a second application to present difference data according to some embodiments.

FIG. 2D shows example method 270 running on client device 102 for a first application to present a content item and a second application to present difference data according to some embodiments. FIG. 2D can be a continuation from step 251 of FIG. 2C. The first application can begin and present the content item in a first graphical user interface (step 272). This content item can be either the first version of the content item or the second version of the content item from FIG. 2C. User action can trigger step 272, for example by client device 102 receiving a user selection to open the content item. The first application can be a word processor or other content item editor. The second application can then detect the presentation of the content item in the first application (step 274). For example, the second application can register a hook within an operating system that manages the first application and the second application, and when the first application loads the content item, the operating system can notify the second application. In some embodiments, the first application is not specially configured to communicate directly with the second application.

The second application can then receive difference data (e.g., the difference content item from step 250 in FIG. 2C) associated with the content item (step 276). Content management system 106 can send the difference data to the second application. In some embodiments, the second application requests a viewing location of the content item (step 278). For example, the first application can have a viewing window showing a portion of the content item and the viewing location can correspond to the portion shown in the viewing window. The first application can provide the viewing location of the content item (step 280). In some embodiments, step 278 triggers step 280, alternatively step 280 can be performed without prompting from the second application.

The second application can then present the difference data associated with the viewing location in a second graphical user interface (step 282). Presenting the difference data can include displaying a characterization of the differences (e.g., if they effect a large size of the content item, if the differences change the meaning of the content item, etc.). In some embodiments, presenting the difference data includes displaying the authorship of the differences. In some embodiments, presenting the difference data includes grouping differences. For example, multiple differences by the same author can be collapsed into a group. Other groupings are contemplated such as groupings by the date of the differences, the size of the differences, the type of differences (deletions, additions, etc.), and so forth. The second graphical user interface can receive a selection of the grouping to expand the grouping to show the individual differences. In some embodiments, showing the differences includes showing the relevant portion of the first or second version of the content item with strikethroughs and underlines to indicate the changes from the corresponding portion of the second or first version of the content item.

The second graphical user interface can be overlaid on the first graphical user interface. In some embodiments, the second graphical user interface is not overlaid on the first graphical user interface, for example, it can be adjoining the first graphical user interface. In some embodiments, the first and second graphical user interfaces are both contained within an operating system interface.

The second application can then receive a user selection to reject a modification presented in the difference data (step 284). The second application can then provide an instruction to the first application, the instruction effective to modify the content item so as to correspond to a rejection of the modification (step 286). For example, the second application can simulate keyboard inputs, interact with a first application API to modify the content item, etc. In some embodiments, step 286 includes sending the instruction to content management system 106; content management system 106 can apply the appropriate modifications resulting in a modified content item and send the modified content item to client device 102; content management system 106 or the second application can then prompt the first application to load the modified version of the content item in place of the content item that was presented in step 272. Alternative to step 274, similar procedures can be implemented to accept a modification, e.g., if the content item currently presented corresponds to a prior version of the content item that does not yet incorporate the changes. The first application can then process the instruction to modify the content item so that the content item reflects a rejection of the modification (step 288).

Figure 3:
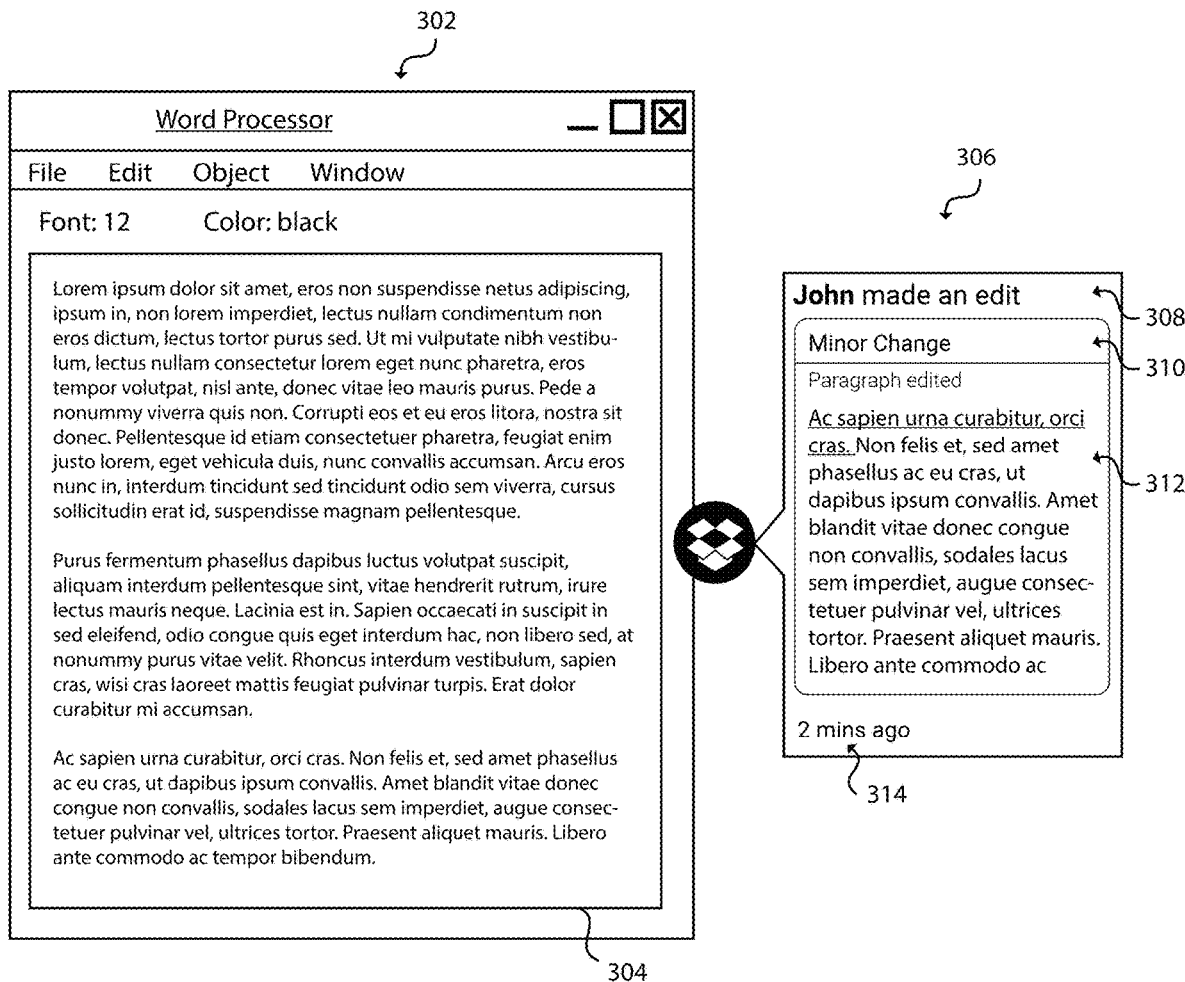
FIG. 3 shows an example graphical user interface for presenting a content item and associated differences according to some embodiments.

FIG. 3 shows an example graphical user interface for presenting a content item and associated differences according to some embodiments. For example, first graphical user interface 302 (e.g., "word processor") can include a presentation of a version of a content item 304. Second graphical user interface 306 can include a presentation of the change data associated with the version of the content item. Second graphical user interface 306 can be presented as an overlay to first graphical user interface 306. Second graphical user interface 306 can interact with first graphical user interface 306. For example, second graphical user interface 306 can show relevant information pertaining to what is currently shown within first graphical user interface 306.

The first version and/or the second version can be "clean" versions of the content item. A clean version lacks "tracked changes" or other artifacts from other versions (e.g., indicating that a previous version was deleted). First graphical user interface 302 can present the content item in a clean form while second graphical user interface 306 can include the changes. In some embodiments, the first version and/or second version is not a clean version and the first graphical user interface 302 hides any artifacts from other version(s) or tracked changes.

Second graphical user interface 306 can represent the change data described in FIGS. 2A and 2B. For example, second graphical user interface 306 can represent change authorship 308, change annotation 310, change preview 312, and change time 314. Second graphical user interface 306 depicts one change in FIG. 3; however, second graphical user interface 306 can display multiple changes. Multiple changes can be grouped or presented according to authorship, time, version of the relevant content item, change type, location within the content item, etc. The change type can be a category selected from a predetermined list of categories (e.g., edit, merge of paragraphs, split of paragraph, move of paragraph, addition of paragraph, deletion of paragraph, or any combination thereof).

In some embodiments, second graphical user interface 306 can be a webhosted application. For example, second graphical user interface 306 can include a webview of a website that includes comments, changes, etc. When second graphical user interface 306 is opened, it can automatically download and render a webpage. In some such embodiments, the webpage is provided by content management system 106.

Annotation 310 can include the characterizations determined in step 208 in FIG. 2A, described above. Annotation 310 can include a comment regarding the change. For example, a comment might explain why a change was made. Annotation 310 can include a category for the change. The category can be a tag, an action (e.g., "reviewed", "approved", etc.), an authority (e.g., "CEO", "project administrator", "attorney", etc.), etc.

Change preview 312 (e.g., markup) can include a presentation of the change using a text markup of the content item. For example, deleted portions can have a strikethrough while added portions can be underlined. Change preview 312 can include an abstraction of one or more changes. For example, an abstraction can include a summary of the change, such as which author made the changes, how many changes the author made, how large the changes were, what type of changes were made, etc. The abstraction can include a short description of the change; such a short description can be automatically generated (e.g., using natural language processing), or supplied by a user. The abstraction can contain a summary of multiple changes and a selectable option to expand the abstraction to provide more detail of the multiple changes. For example, expanding the abstraction can reveal two or more detailed changes (e.g., detailed markup of the changes).

Figure 4:
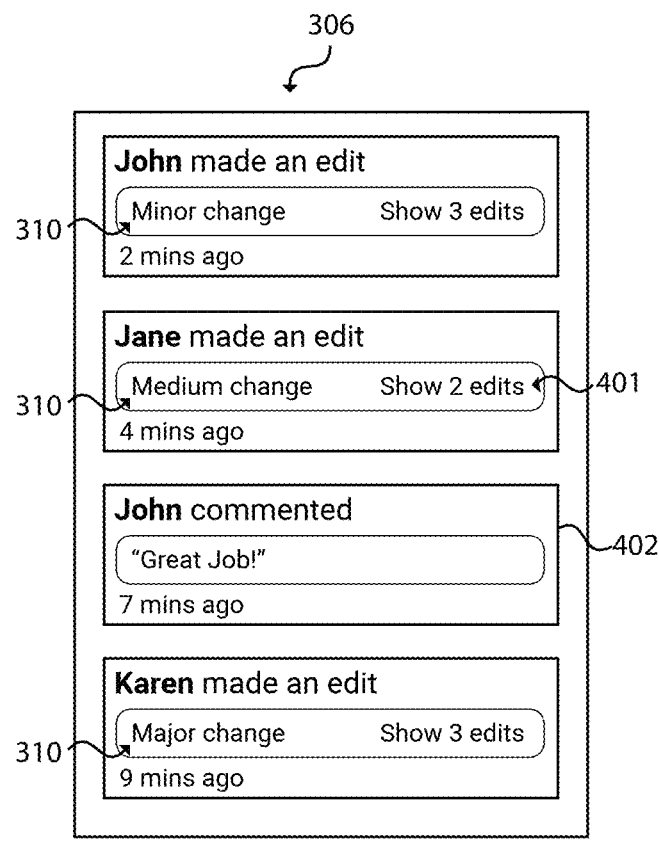
FIG. 4 shows an example graphical user interface for presenting differences and comments according to some embodiments.

FIG. 4 shows a graphical user interface (e.g., second graphical user interface 306) for presenting differences and comments according to some embodiments. For example, multiple changes can be presented within second graphical user interface 306. These changes can be organized chronologically. Comment 402 can also be presented within second graphical user interface 306. Comment 402 can be presented chronologically with changes (e.g., chronologically according to times associated with the comment 402 and changes). In some embodiments, comments (e.g., comment 402) can be relevant to a particular portion of the content item (e.g., an embedded comment) or relevant to the content item as a whole. In some embodiments, comments can be harvested from communications (e.g., emails, instant messages, collaborative documents, etc.) related to the content item. For example, content management system 106 can integrate with email and, when a user sends a content item with an email (e.g., as a share link, an attachment, or an invitation to view the content item online), the text of the email can be associated with the content item as a comment. A user can identify or otherwise provide input to assist in associating communications with content items so that the communications can be presented as comments. In some embodiments, comment 402 and changes can be presented according to their associated locations in the content item. In some embodiments, comment 402 and changes can be grouped according to an associated author, user account, client device 102 (e.g., a client device 102 where the respective comment or change was made), etc.

Annotation 310 can be termed a change abstraction. In some embodiments, the change abstraction includes a summary of multiple changes. For example, if two changes are characterized as "minor changes" then the change abstraction can summarize the changes as being a minor change with two associated edits. Other techniques for summarizing and describing multiple changes are contemplated; for example, the change abstraction can describe a more interesting (e.g., the most significant, major, extensive, etc.) change of the multiple changes. The change abstraction can summarize characterizations of the multiple changes. In some embodiments, change abstraction includes graphical user interface object 401 for expanding the summary of the two or more changes to reveal two or more detailed changes. For example, a user can select graphical user interface object 401 and reveal detail about the two changes. An example expanded summary is provided in FIG. 5D where detail about multiple changes is provided with a change abstraction.

FIGS. 5A-5F show various second graphical user interfaces 306 for representing differences according to various embodiments. For example, in FIG. 5A, second graphical user interface 306 presents that a paragraph has moved. In FIG. 5B, second graphical user interface 306 presents that a paragraph was edited. Various techniques can be used to indicate that a content item has been changed, such as strikethrough and underline (as in FIG. 5B), but other techniques are contemplated (e.g., using different coloration to indicate deletion, addition, etc.). In FIG. 5C, second graphical user interface 306 presents a nested change; for example, the paragraph has been moved and edited.

In FIG. 5D, second graphical user interface 306 depicts multiple changes grouped by a single author. FIG. 5E presents an annotation 310 of a change in second graphical user interface 306; for example, the edits are characterized as a "minor change". FIG. 5F represents an annotation 310 of a change in second graphical user interface 306; for example, the changes are characterized as a "significant change". The changes are characterized as significant because they have great significance to the content item (e.g., reversing the original meaning of the content item, having legal implications, etc.), despite being small in quantity.

In some embodiments, a description (e.g., characterization) of a change can describe a magnitude of the change. The term magnitude can be descriptive of the significance of the change (the degree in which the change affects the meaning of the content item), the quantity of the change (e.g., the size of the changed portion), the importance of the changed portion (e.g., was the changed portion merely a footnote or a major section like an introduction or title), a flag manually set by the author of the change (e.g., an author can flag the change as important or requiring review), etc. Alternative to describing a magnitude of the change, the description can describe a type of the change (e.g., "add", "delete", "move", "modify", or similar).

Comparison module 136 can determine a magnitude of the changed based on predetermined thresholds. For example, if a change affects multiple sentences, comparison module 136 can label the change a major change. Predetermined thresholds can include a percentage of the content item effected by the change, to what degree the change effects the meaning, etc.

Figure 6:
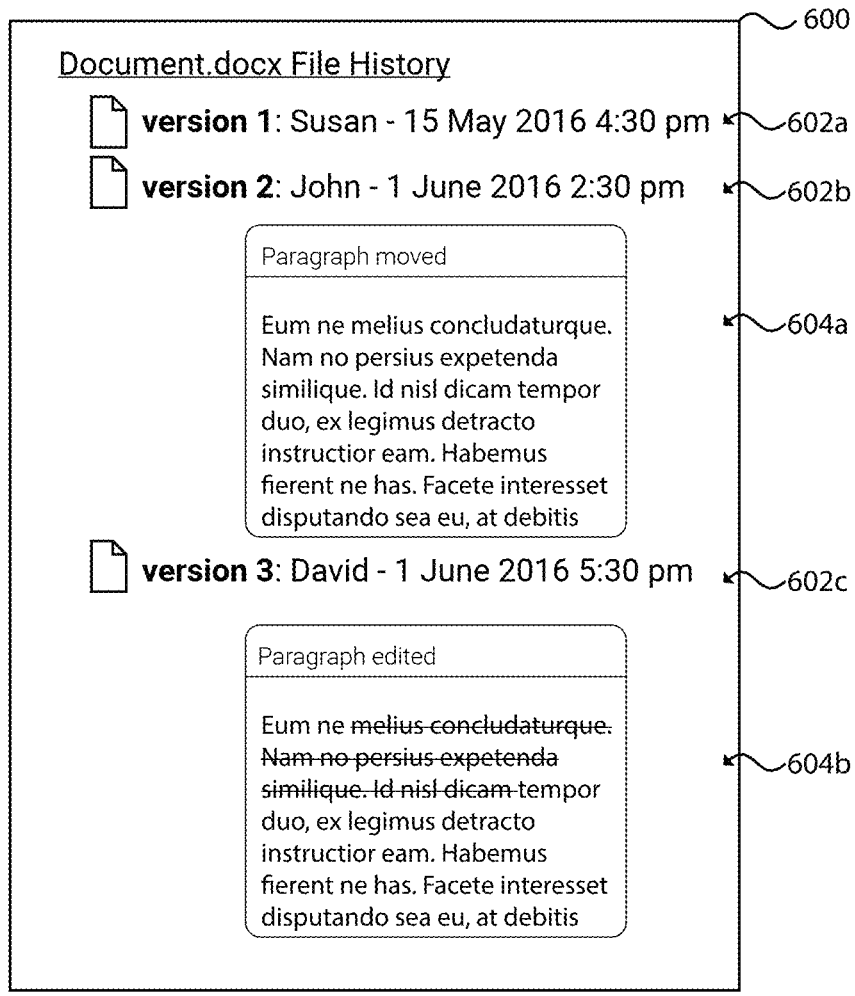
FIG. 6 shows an example history for a content item.

FIG. 6 shows an example history 600 for a content item ("document.docx"). In some embodiments, different users over time submit changes to the content item (e.g., through a synchronization process) and these changes result in the different version of the content item. History 600 can include version labels 602 (e.g., 602a-602c) representing the state of the content item at various points. For example version label $602_a$ can represent the submitter of a version (e.g., the author of any changes) and the date and time of the submission. In some embodiments, label 602 is selectable. Upon selecting label 602, the respective version of the content item can be presented to a user. In some embodiments, label 602 can describe a version of a content item that represents changes from multiple users.

Changelog 604 (e.g., $604_a$ and $604_b$) can be associated with label 602. Changelog 604 can be similar to second graphical user interface 306, including similar information such as annotation 310 and change preview 312. Changelog 604 can include a description of changes from the associated version and a preceding version (either the immediate predecessor or some other predecessor).

History 600 can include comments. At least some of these comments can be associated with individual changes in changelog 604 while at least some of these comments can be associated with the content item (or the various versions of the content item) as a whole.

In some embodiments, history 600 describes changes, comments, versions, that are unseen by an associated user (e.g., a user that requests the production of history). "Unseen" can mean that the associated user has not opened, viewed, modified, or performed a similar action with regards to the content item since the changes, comments, or versions were made.

Figure 7:
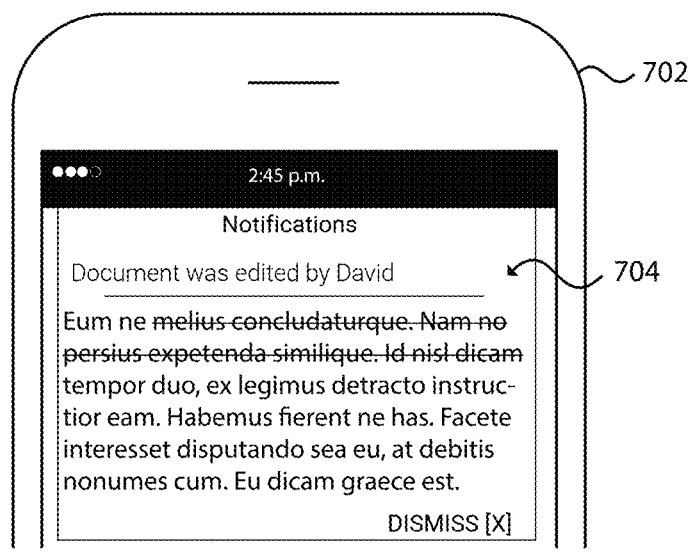
FIG. 7 shows an example notification presented on a portable electronic device.

FIG. 7 shows notification 704 presented on phone 702. Many electronic devices (e.g., client device 102) such as phone 702 have the ability to present notifications (including, e.g., "toasts"). Notification 704 can be a form of second graphical user interface 306, including similar information. For example, notification 704 can include a description of changes made to a content item, an identification of the author(s) that made those changes, when the changes were made (e.g., how long ago), etc. In some embodiments, notification 704 includes information for content items that are associated with the client device 102 or the user of the client device 102. For example, a user can subscribe to a content item and notification 704 can then show information pertaining to that content item (e.g., comments, changes, etc.). A content item can otherwise be considered relevant for the purposes of notification 704 if the associated user has previously modified the content item, if the user is tagged in the content item, if the author of the changes has tagged the user, etc.

FIG. 8 shows an email 800 including history 600. For example, when an author changes a content item, other users that are relevant to the content item (e.g., users that are tagged in the content item, users that have edited the content item, users that have subscribed to the content item, etc.) can receive an email including a description of the changes. For example, the email 800 can include history 600. In some embodiments, an email 800 is only sent periodically and history 600 describes changes that have occurred since the previous email 800 or the previous interaction by the relevant user.

Figure 9:
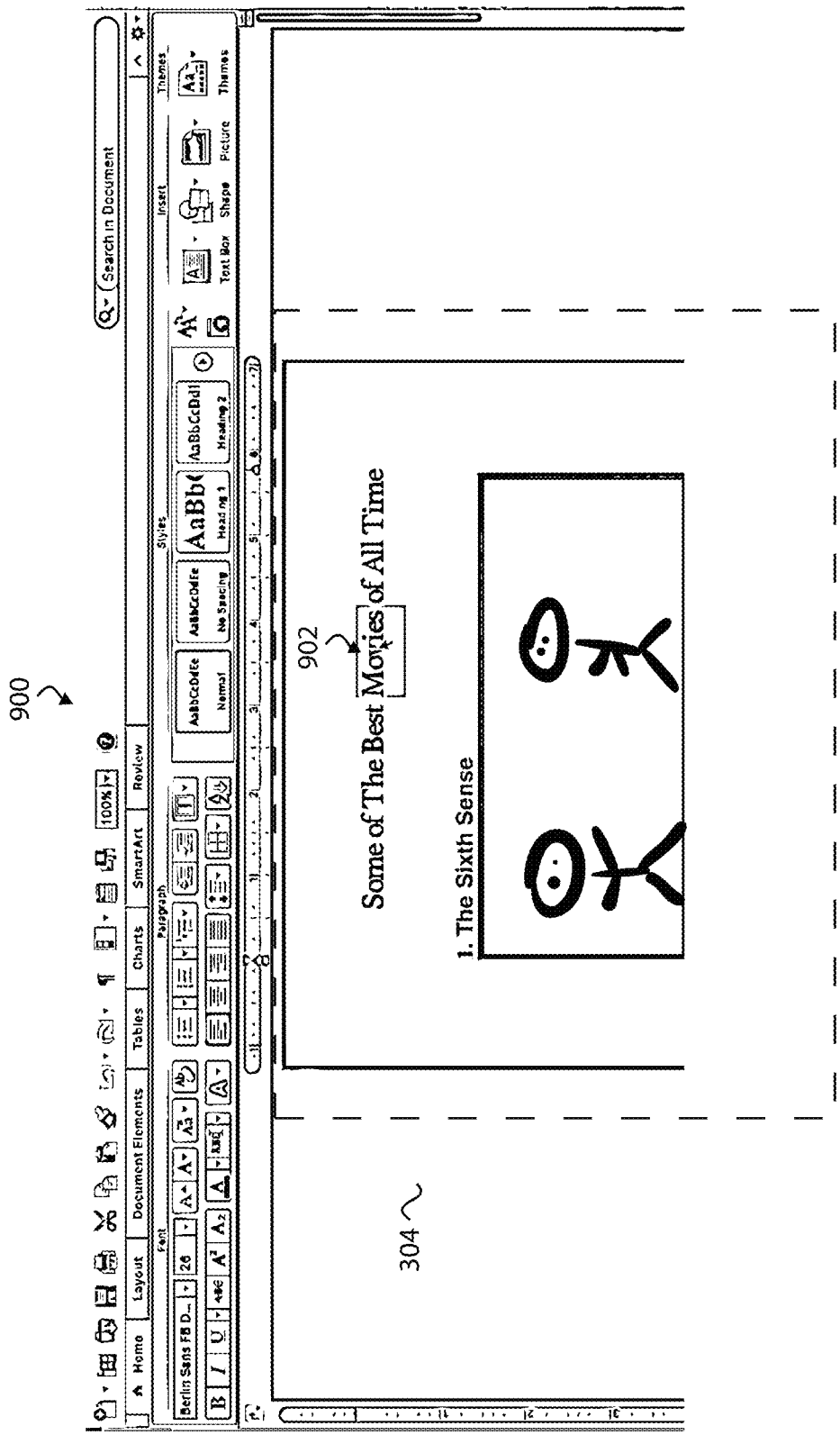
FIG. 9 shows an example word processor with a representation of a current version of a content item according to various embodiments.

FIG. 9 shows an example word processor 900 with a representation of the current version of the content item 304. At location 902, a user is about to modify "movies" to say "spoilers".

Figure 10:
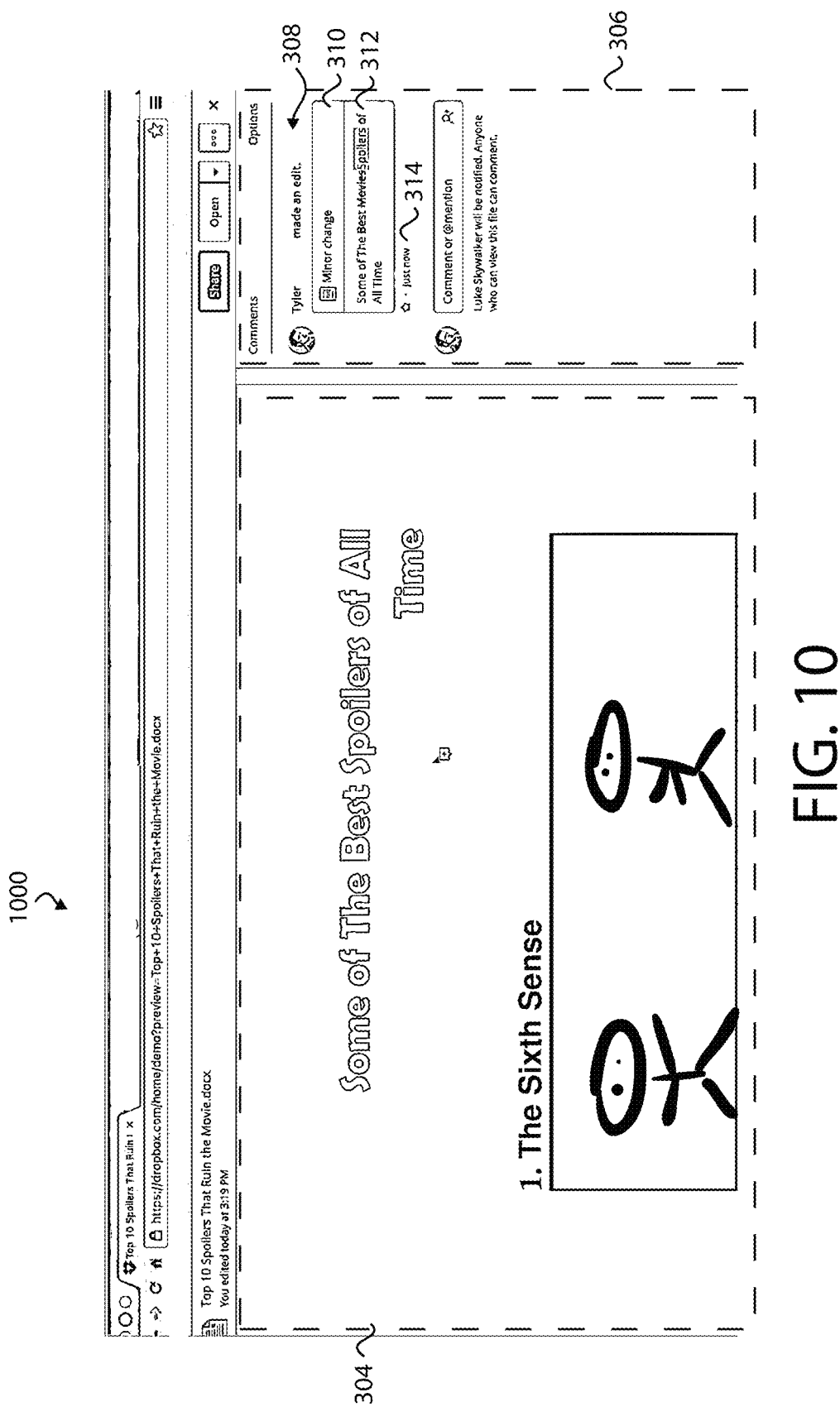
FIG. 10 shows an example web browser running a web application according to various embodiments.

FIG. 10 shows an example web browser 1000 running a web application according to various embodiments. A representation of the current version of the content item 304 can be displayed in one portion of the viewport of web browser 900 while second graphical user interface 306 can be represented in another portion of the viewport. Comments section can include change authorship 308, change annotation 310, change preview 312, and change time 314. FIG. 10 demonstrates how the change in FIG. 9 of "movies" to "spoilers" can be represented in web browser 1000 using a representation of content item 304 and second graphical user interface 306.

Figure 11A:
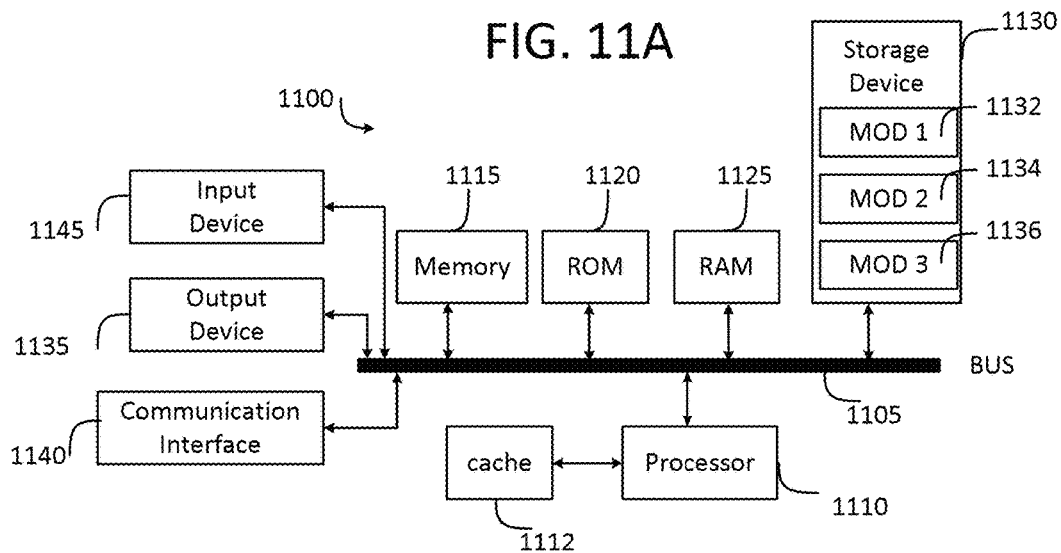
FIG. 11A shows an example possible system embodiment for implementing various embodiments of the present technology.
Figure 11B:
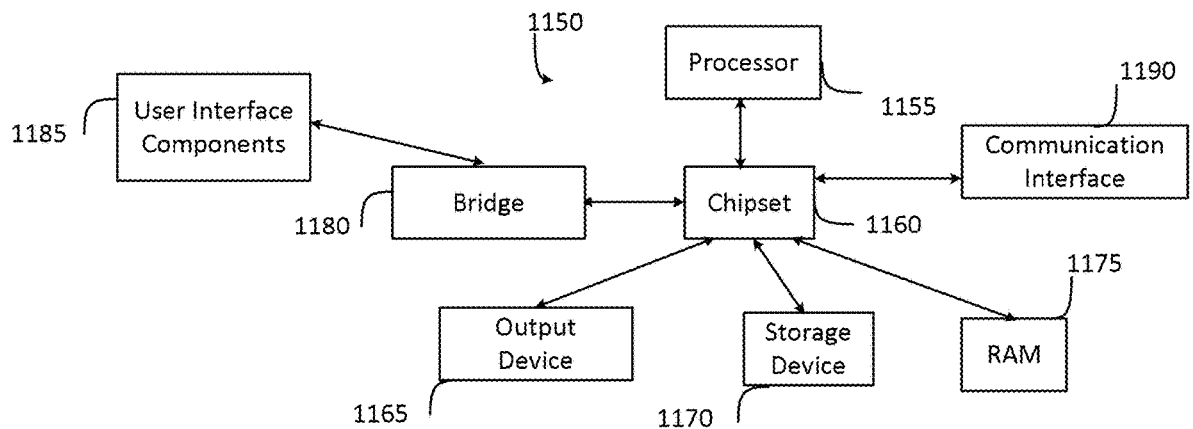
FIG. 11B shows an example possible system embodiment for implementing various embodiments of the present technology.

FIG. 11A and FIG. 11B show example possible system embodiments. The more appropriate embodiment will be apparent to those of ordinary skill in the art when practicing the present technology. Persons of ordinary skill in the art will also readily appreciate that other system embodiments are possible.

FIG. 11A illustrates a conventional system bus computing system architecture 1100 wherein the components of the system are in electrical communication with each other using a bus 1105. Example system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates a computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that example systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A non-transitory computer readable medium comprising instructions stored on the non-transitory computer readable medium, the instructions, when executed by a computing system, cause the computing system to:
   cause display of at least a portion of a first version of a content item in a first graphical user interface of a first application associated with the content item;
   receive change data from a content management system, the change data reflecting changes made to another version of the content item at a second device compared with the first version of the content item;
   request, from the first application, by a second application associated with the content management system and executing on the computing system, a viewing location of the content item that is presented in the first graphical user interface;
   receive, by the second application, the viewing location of the content item that is presented in the first graphical user interface of the first application;
   detect, by the second application associated with the content management system, one or more portions of the change data correlating with the viewing location, wherein the one or more portions are separated based on corresponding editors and timestamps; and
   cause display, in a second graphical user interface presented by the second application on the computing system, of one or more separated portions of detailed changes based on the change data, wherein the detailed changes displayed are detailed markups of the change data that dynamically correlate with the viewing location of the content item that is presented in the first graphical user interface.

2. The non-transitory computer readable medium of claim 1, wherein the instructions, when executed by the computing system, further cause the computing system to:
   monitor, via the second application, interactions between the first application and the first version of the content item, the interactions comprising storage access events associated with the first version of the content item; and
   based on the monitoring by the second application of interactions between the first application and the first version of the content item, detect the interaction via the second application.

3. The non-transitory computer readable medium of claim 1, wherein the instructions, when executed by the computing system, further cause the computing system to:
   register, by the second application, a hook within an operating system that manages the first application and the second application, and
   notify, by the operating system, the second application of the viewing location of the content item in the first application.

4. The non-transitory computer readable medium of claim 1, wherein the instructions, when executed by the computing system, further cause the computing system to:
   after causing the display of the at least the portion of the first version of the content item in the first graphical user interface, cause display, in the first graphical user interface of the first application, a different portion of the first version of the content item;
   based on the display of the different portion of the first version of the content item in the first graphical user interface, determine, by the second application, that a content displayed in the first graphical user interface has changed from the at least the portion of the first version of the content item to the different portion of the first version of the content item; and
   in response to determining that the content displayed in the first graphical user interface changed to the different portion of the first version of the content item, cause display, in the second graphical user interface of the second application, second change data identifying a different one of the changes in the first version of the content item, the different one of the changes pertaining to the different portion of the first version of the content item.

5. The non-transitory computer readable medium of claim 1, wherein a description of the at least one of the changes comprises a markup showing the at least one of the changes, and wherein the change data comprises a summary of two or more changes grouped together based on a commonality between the two or more changes, the second graphical user interface further displaying a user interface object that, when activated, causes the second graphical user interface to expand the summary of the two or more changes to display respective details pertaining to the two or more changes.

6. A method comprising:
   storing, in association with a user account at a content management system, a content item;
   receiving, at the content management system, change data reflecting a first version of the content item including changes made to another version of the content item from a second device;
   determining, by the content management system, differences between the stored content item and the first version of the content item; and
   creating difference data including the change data and transmitting, to a client device, data effective to:
      cause display, on the client device, of at least a portion of the first version of the content item in a first graphical user interface of a first application associated with the content item;
      receive, by the client device, the change data from a content management system, the change data reflecting changes made to another version of the content item at a second device compared with the first version of the content item;
      request, from the first application, by a second application associated with the content management system and executing on the client device, a viewing location of the content item that is presented in the first graphical user interface;
      receive, by the second application, the viewing location of the content item that is presented in the first graphical user interface of the first application;
      detect, by the second application associated with the content management system, one or more portions of the change data correlating with the viewing location, wherein the one or more portions are separated based on corresponding editors or timestamps; and
      cause display, in a second graphical user interface presented by the second application on the client device, of one or more separated portions of detailed changes based on the change data, wherein the detailed changes displayed are detailed markups of the change data that dynamically correlate with the viewing location of the content item that is presented in the first graphical user interface.

7. The method of claim 6, wherein determining the differences comprises:
   matching paragraphs between the first version of the content item and a second version of the content item;

determining that a first paragraph in a first location of the first version of the content item corresponds to a second paragraph in a second location of the second version of the content item when a comparison score associated with the first paragraph in the first version and the second paragraph in the second version satisfies a predetermined threshold;

determining that the first paragraph in the first version of the content item is not identical to the second paragraph in the second version; and categorizing one or more differences between the first paragraph and the second paragraph into a category.

8. The method of claim 7, further comprising quantifying a number of differences between the first paragraph and the second paragraph, and wherein an abstraction indicates the number of differences between the first paragraph and the second paragraph.

9. The method of claim 6, wherein the differences comprise at least one of a format change or a metadata change, wherein an abstraction identifies the at least one of the format change or the metadata change.

10. The method of claim 6, further comprising:
grouping a set of the differences comprises categorizing a first set of the differences into a category corresponding to a commonality, wherein a summary indicates the category associated with the group of differences, the category comprising a type of revision.

11. The method of claim 6, wherein the differences comprise at least one of a font change or a paragraph indentation.

12. The method of claim 6, wherein an abstraction indicates that the change dad in the content item alters a semantic meaning of the content item.

13. The method of claim 6, wherein the content item is shared between at least two user accounts through the content management system.

14. The method of claim 13, further comprising:
identifying an electronic communication message transmitted between electronic communication user addresses associated with the at least two user accounts via an electronic messaging application, the electronic communication message pertaining to the content item;
extracting a content of the electronic communication message;
based on the content of the electronic communication message, generating a comment associated with the content item; and
providing, to the client device, the comment in association with the at least one of the first version of the content item or a second version of the content item.

15. The method of claim 13, further comprising:
sending a notification to a first user account from the at least two user accounts identifying one or more of: a difference, an annotation, or a comment made by a second user account with respect to the content item.

16. The method of claim 6, wherein the data is further effective to: causing display of a version history including the differences and comments associated with the first version and a second version of the content item.

17. A system comprising:
one or more processors; and
a non-transitory computer readable medium storing processor instructions that, when executed by the one or more processors, cause the system to:
determine, by a content management system, change data reflecting changes made to a first version of a content item from a client device, wherein the content item is stored in association with a user account associated with the content management system, and wherein the change data is received from a first application associated with the content item and configured to edit the content item;
request, from the first application, by a second application associated with the content management system and executing on the client device, a viewing location of the content item that is presented in a first graphical user interface;
receive, by the second application, the viewing location of the content item that is presented in the first graphical user interface of the first application;
detect, by the second application associated with the content management system, one or more portions of the change data correlating with the viewing location, wherein the one or more portions are separated based on corresponding editors or timestamps; and
cause display, in a second graphical user interface presented by the second application, of one or more separated portions of detailed changes based on the change data, wherein the detailed changes displayed are detailed markups of the change data that dynamically correlate with the viewing location of the content item that is presented in the first graphical user interface.

18. The system of claim 17, the non-transitory computer readable medium storing processor instructions that, when executed by the one or more processors, cause the system to:
monitor, interactions between the first application and the first version of the content item, the interactions comprising storage access events associated with the first version of the content item; and
based on the monitoring of interactions between the first application and the first version of the content item, detect the interaction.

19. The system of claim 17, the non-transitory computer readable medium storing processor instructions that, when executed by the one or more processors, cause the system to:
determine, based on second information received regarding a different portion of the first version of the content item, that a content has changed from a first portion of the first version of the content item to the different portion of the first version of the content item; and
in response to determining that the content changed to the different portion, cause display, in the second graphical user interface, second change data identifying a different one of the changes in the first version of the content item, the different one of the changes pertaining to the different portion.

20. The system of claim 17, wherein the change data comprises an indication of an activity status of a user account associated with an author of one or more of the changes.

* * * * *

UNITED STATES PATENT AND TRADEMARK OFFICE
CERTIFICATE OF CORRECTION

PATENT NO. : 11,941,344 B2
APPLICATION NO. : 15/280442
DATED : March 26, 2024
INVENTOR(S) : Amir Baron et al.

It is certified that error appears in the above-identified patent and that said Letters Patent is hereby corrected as shown below:

In the Claims

In Claim 12, Column 25, Lines 31-32:
"The method of claim 6, wherein an abstraction indicates that the change dad in the content item alters a"
Should be corrected as follows:
"The method of claim 6, wherein an abstraction indicates that the changes in the content item alters a"

In Claim 14, Column 25, Line 49:
"with the at least one of the first version of the content"
Should be corrected as follows:
"with at least one of the first version of the content"

Signed and Sealed this
Ninth Day of July, 2024

Katherine Kelly Vidal
*Director of the United States Patent and Trademark Office*